No. 612,749. Patented Oct. 18, 1898.
J. McCORMICK.
GAGE.
(Application filed Dec. 16, 1897.)
(No Model.)

WITNESSES:

INVENTOR
J. McCormick

BY

ATTORNEYS.

UNITED STATES PATENT OFFICE.

JOHN McCORMICK, OF WILMERDING, PENNSYLVANIA.

GAGE.

SPECIFICATION forming part of Letters Patent No. 612,749, dated October 18, 1898.

Application filed December 16, 1897. Serial No. 662,118. (No model.)

*To all whom it may concern:*

Be it known that I, JOHN McCORMICK, of Wilmerding, in the county of Allegheny and State of Pennsylvania, have invented a new and Improved Gage, of which the following is a full, clear, and exact description.

The object of the invention is to provide a new and improved gage arranged to cut off water and steam automatically to prevent the same from escaping at the gage-glass in case the latter becomes broken and at the same time make an automatic connection with a second glass.

The invention consists of novel features and parts and combinations of the same, as will be fully described hereinafter and pointed out in the claims.

Reference is to be had to the accompanying drawings, forming a part of this specification, in which similar characters of reference indicate corresponding parts in both the figures.

Figure 1:
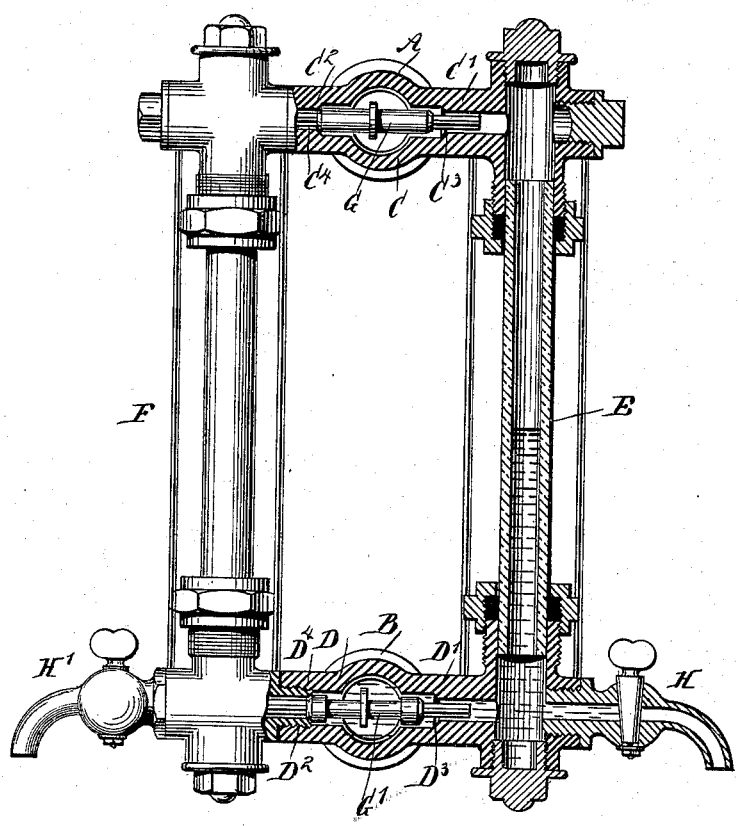
Figure 2:
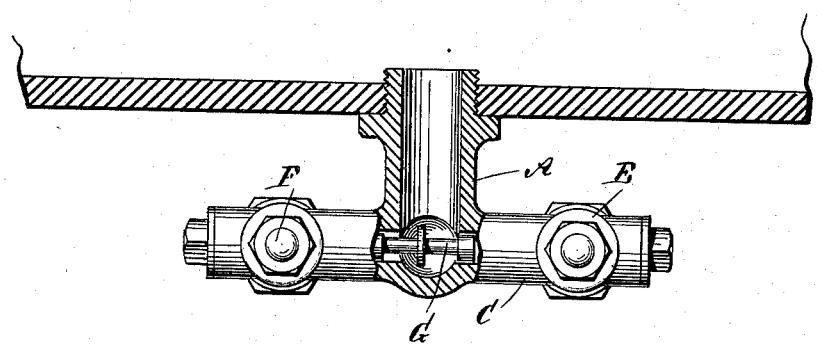

Figure 1 is a front elevation of the improvement with parts in section, and Fig. 2 is a plan view of the same with parts in section.

The improved gage is provided with the connections A and B, leading to the steam and water compartments of the boiler on which the device is used, the connection A terminating at its outer end in a valve-casing C, and a similar valve-casing D is arranged on the outer end of the connection B. The valve-casings C and D are provided with oppositely-arranged outlets C' $C^2$ and D' $D^2$, respectively, of which the outlets C' and D' connect with a glass E and the outlets $C^2$ and $D^2$ connect with a second glass F.

In the valve-casings C and D are fitted to slide the double valves G G', respectively, adapted to be seated on valve-seats $C^3$ and $D^3$ in the outlets C' and D' and on valve-seats $C^4$ and $D^4$ on the outlets $C^2$ and $D^2$, respectively, it being understood that when the valves are seated on the seats in one outlet the other seats are uncovered, as will be readily understood by reference to Fig. 1.

On the outlets D' and $D^2$ are arranged faucets H H', respectively, adapted to be opened for receiving the valves automatically to establish communication between the water-compartments of the boiler and the glass E or F. For instance, when it is desired to use the glass E for gaging purposes then the operator opens for an instant the faucet H', whereupon the water from the connections A and B escapes through the faucet H' and in so doing acts on the valves G and G' in such a manner that the valves G and G' are shifted to the left upon the seats $C^4$ and $D^4$ to close the outlets $C^2$ and $D^2$, respectively, and to establish communication between the connections A and B with the outlets C' and D' and the gage-glass E. Now when the latter breaks then the outrushing steam and water shift the valves G and G' to the right upon the seats $C^3$ and $D^3$ to close the outlets C' and D' to prevent the escape of steam and water at the broken glass E. The shifting of the valves G and G' to the right uncovers the seats $C^4$ and $D^4$, so that communication is established between the connections A and B and the glass F, which now indicates the level of the water in the boiler. The broken glass E is removed and replaced by a new one, and in case the glass F should break the outrushing steam and water will shift the valves G and G' to the left to prevent the escape of steam and water and to establish communication between the boiler and the glass E. Thus it is evident that whenever a glass breaks the steam and water are immediately shut off from this broken glass and at the same time the other gage-glass is brought into action for indicating the level of the water in the boiler.

The device is very simple and durable in construction and is not liable to get out of order, suitable provision being made for conveniently replacing broken glasses.

Having thus fully described my invention, I claim as new and desire to secure by Letters Patent—

1. A gage, having two gage-tubes and tubular connection between the tubes, the tubular connection having a supply-orifice therein and having a valve-seat on each side of the supply-orifice, and a duplex valve movable to seat against either one of the two valve-seats and automatically shifted by the pressure of fluid thereon.

2. In a gage, the combination of two gage-tubes, a cock commanding the outlet-orifice of each tube, a tubular connection between the tubes, the tubular connection having an intermediately-located inlet-orifice and having a valve-seat on each side of said orifice, and a duplex valve located in said tubular connection and between the valve-seats, and shifted automatically by the action of fluid to bear against either one of the two valve-seats.

JOHN McCORMICK.

Witnesses:
W. A. HOLLAND,
J. M. VOTAW.